(12) United States Patent
Nakai et al.

(10) Patent No.: US 11,703,054 B2
(45) Date of Patent: Jul. 18, 2023

(54) SCROLL COMPRESSOR

(71) Applicant: DAIKIN INDUSTRIES, LTD., Osaka (JP)

(72) Inventors: Ryouta Nakai, Osaka (JP); Yoshitomo Tsuka, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/752,468

(22) Filed: May 24, 2022

(65) Prior Publication Data

US 2022/0282730 A1 Sep. 8, 2022

Related U.S. Application Data

(63) Continuation of application No. PCT/JP2020/043641, filed on Nov. 24, 2020.

(30) Foreign Application Priority Data

Nov. 29, 2019 (JP) .................................. 2019-217312

(51) Int. Cl.
*F04C 18/02* (2006.01)
*F04C 23/00* (2006.01)
(Continued)

(52) U.S. Cl.
CPC ........ *F04C 18/0215* (2013.01); *F04C 23/008* (2013.01); *F04C 29/02* (2013.01);
(Continued)

(58) Field of Classification Search
CPC .... F04C 18/0215; F04C 23/008; F04C 29/02; F04C 2210/26; F04C 2240/30;
(Continued)

(56) References Cited

U.S. PATENT DOCUMENTS 6,533,558 B1 *  3/2003  Matsumoto ......... F04C 29/0085
                                                417/410.3
6,925,832 B2 *  8/2005  Kitaura ................... F01C 21/10
                                                417/410.5
(Continued)

FOREIGN PATENT DOCUMENTS

JP     2003-286949 A    10/2003
JP     2016-200122 A    12/2016

OTHER PUBLICATIONS

International Search Report of corresponding PCT Application No. PCT/JP2020/043641 dated Feb. 2, 2021.
(Continued)

*Primary Examiner* — Charles G Freay
*Assistant Examiner* — Lilya Pekarskaya
(74) *Attorney, Agent, or Firm* — Global IP Counselors, LLP

(57) ABSTRACT

A scroll compressor includes a scroll compression mechanism, a motor, and a casing. The motor includes a stator having a stator core and an insulator, a rotor disposed inside the stator, a coil wound around a plurality of teeth of the stator core via the insulator, and an outgoing line at an end of the coil. When the motor is viewed along a rotation axis of the rotor, at least one of the outgoing line and a film wound around the outgoing line satisfies $0.65<(D1-da)/(D1-D2)<0.95$. An outer radius of the teeth centered on a position of the rotation axis of the rotor is D1. An inner radius of the teeth is D2. An average distance from the position of the rotation axis of the rotor to the at least one of the outgoing line and the film wound around the outgoing line is da.

16 Claims, 7 Drawing Sheets

(51) Int. Cl.
*F04C 29/02* (2006.01)
*H02K 1/16* (2006.01)
*H02K 1/18* (2006.01)

(52) U.S. Cl.
CPC .............. *H02K 1/16* (2013.01); *H02K 1/185* (2013.01); *F04C 2210/26* (2013.01); *F04C 2240/30* (2013.01); *F04C 2240/40* (2013.01); *F04C 2240/60* (2013.01)

(58) Field of Classification Search
CPC .. F04C 2240/40; F04C 2240/60; F04C 18/02; H02K 1/16; H02K 1/185; H02K 3/34; H02K 15/026
See application file for complete search history.

(56) References Cited

U.S. PATENT DOCUMENTS

| | | | | |
|---|---|---|---|---|
| 2001/0038797 | A1* | 11/2001 | Makino | H02K 7/14 417/410.3 |
| 2004/0197209 | A1 | 10/2004 | Kitaura et al. | |
| 2006/0099086 | A1* | 5/2006 | Morozumi | F04C 29/02 417/65 |
| 2009/0315418 | A1 | 12/2009 | Hasegawa | |
| 2011/0109189 | A1* | 5/2011 | Taema | H02K 15/095 310/215 |
| 2011/0285240 | A1* | 11/2011 | Tsukamoto | H02K 3/522 310/215 |
| 2013/0004345 | A1 | 1/2013 | Horiba et al. | |
| 2015/0028712 | A1* | 1/2015 | Horiba | H02K 7/14 310/195 |
| 2016/0315517 | A1* | 10/2016 | Aota | H02K 7/14 |
| 2018/0097419 | A1* | 4/2018 | Suzuki | F04C 29/026 |
| 2019/0006894 | A1* | 1/2019 | Kobayashi | H02K 1/185 |
| 2019/0249653 | A1* | 8/2019 | Suzuki | H02K 1/16 |
| 2019/0331120 | A1 | 10/2019 | Guntermann et al. | |

OTHER PUBLICATIONS

International Preliminary Report of corresponding PCT Application No. PCT/JP2020/043641 dated Jun. 9, 2022.

* cited by examiner

SCROLL COMPRESSOR

CROSS-REFERENCE TO RELATED APPLICATIONS

This is a continuation of International Application No. PCT/JP2020/043641 filed on Nov. 24, 2020, which claims priority to Japanese Patent Application No. 2019-217312, filed on Nov. 29, 2019. The entire disclosures of these applications are incorporated by reference herein.

BACKGROUND

Technical Field

The present disclosure relates to a scroll compressor.

Background Art

In JP 2003-286949 A, a scroll compressor is known that guides part of a refrigerant discharged from a compression mechanism from space above the motor to space below the motor to cool a motor. In such a scroll compressor, the refrigerant that has flowed into the space below the motor turns around in the space below the motor and flows into the space above the motor again, and finally flows out to the outside of the scroll compressor through a discharge pipe.

SUMMARY

A scroll compressor according to a first aspect includes a scroll compression mechanism configured to compress a refrigerant, a motor configured to drive the scroll compression mechanism, and a casing housing the scroll compression mechanism and the motor. The motor includes a stator including a stator core and an insulator, a rotor disposed inside the stator, a coil wound around a plurality of teeth of the stator core via the insulator, and an outgoing line provided at an end of the coil. When the motor is viewed along a rotation axis of the rotor, at least one of the outgoing line and a film wound around the outgoing line satisfies $0.65 < (D1-da)/(D1-D2) < 0.95$. An outer radius of the teeth centered on a position of the rotation axis of the rotor is D1. An inner radius of the teeth is D2. An average distance from the position of the rotation axis of the rotor to the at least one of the outgoing line and the film wound around the outgoing line is da.

DETAILED DESCRIPTION OF EMBODIMENT(S)

Figure 1:
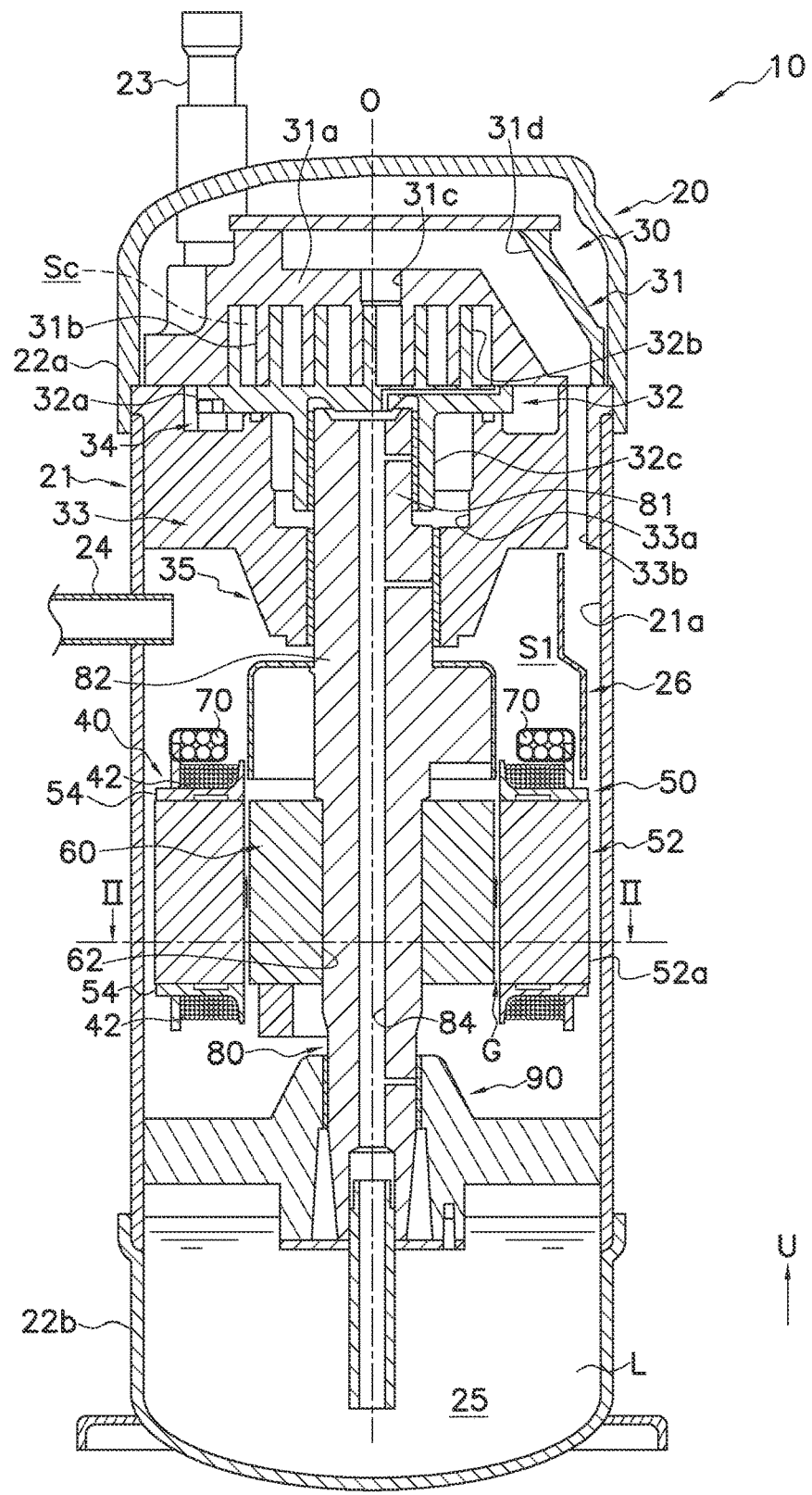
FIG. 1 is a schematic longitudinal cross-sectional view of a scroll compressor according to one embodiment.

A scroll compressor 10 according to one embodiment will be described with reference to the drawings. Note that in order to avoid making the drawings difficult to see, part of reference signs may be omitted in the drawings.

(1) Overall Configuration

The overall configuration of the scroll compressor 10 will be described with reference to FIG. 1. FIG. 1 is a schematic longitudinal cross-sectional view of the scroll compressor 10.

The scroll compressor 10 is used for a refrigeration cycle apparatus such as an air conditioner, and constitutes part of a refrigerant circuit of the refrigeration cycle apparatus. In the refrigeration cycle apparatus, when used for the refrigeration cycle apparatus, the scroll compressor 10 takes in and compresses a low-pressure refrigerant in a refrigeration cycle, and discharges a high-pressure refrigerant in the refrigeration cycle to the refrigerant circuit.

The scroll compressor 10 mainly includes a casing 20, a compression mechanism 30, a motor 40, a crank shaft 80, and a lower bearing 90, as shown in FIG. 1.

In the scroll compressor 10, the motor 40 is disposed in a high-pressure space into which a high-pressure refrigerant gas discharged by the compression mechanism 30 flows. In short, the scroll compressor 10 is a high-pressure dome-type scroll compressor.

(2) Detailed Configuration

The detailed configuration of the scroll compressor 10 will be described below.

Note that in the following description, for convenience of description, expressions such as "upper" and "lower" may be used for describing directions and placement. Unless otherwise specified, the direction indicated by an arrow U in FIG. 1 is upward. In the following description, expressions such as parallel, vertical, horizontal, and perpendicular may be used, and include not only the cases of strictly parallel, vertical, horizontal, perpendicular, and the like, but also the cases of substantially parallel, vertical, horizontal, perpendicular, and the like.

(2-1) Casing

The casing 20 includes a body 21, an upper lid 22a, and a lower lid 22b, as shown in FIG. 1. The body 21 is a cylindrical member with upper and lower openings. The upper lid 22a is provided at the upper end of the body 21. The lower lid 22b is provided at the lower end of the body 21. The body 21, the upper lid 22a, and the lower lid 22b are fixed by welding so as to maintain airtightness.

The casing 20 houses components of the scroll compressor 10 therein, including the compression mechanism 30, the motor 40, the crank shaft 80, and the lower bearing 90, as shown in FIG. 1.

An upper part of the casing 20 is provided with an intake pipe 23 that penetrates the upper lid 22a of the casing 20, as shown in FIG. 1. The intake pipe 23 is a pipe that supplies a low-pressure gas refrigerant to be compressed by the compression mechanism 30 from a refrigerant circuit to which the scroll compressor 10 is connected. The intake pipe 23 is airtightly attached to the upper lid 22a. The lower end of the intake pipe 23 is connected to a fixed scroll 31 of the compression mechanism 30, which will be described later. The intake pipe 23 communicates with a compression chamber Sc of the compression mechanism 30.

A discharge pipe 24 is provided in an up-and-down middle portion of the body 21 of the casing 20 as shown in FIG. 1. A high-pressure gas refrigerant compressed by the scroll compressor 10 is discharged to the discharge pipe 24. The discharge pipe 24 is airtightly attached to the body 21. The end of the discharge pipe 24 within the casing 20 is disposed in a first space S1 between a housing 33 of the compression mechanism 30, which will be described later, and the motor 40.

An oil reservoir space 25 is formed in the lower part of the casing 20. The oil reservoir space 25 stores an oil L (refrigerating machine oil) for lubricating a sliding portion of the compression mechanism 30 and the crank shaft 80. The oil L in the oil reservoir space 25 passes through an oil supply path 84 formed inside the crank shaft 80 and is supplied to the sliding portion of the compression mechanism 30 and the crank shaft 80. Part of the oil L that has lubricated the compression mechanism 30 and the crank shaft 80 passes through a gap formed between a stator 50 of the motor 40, which will be described later, and the body 21, and returns to the oil reservoir space 25 below the casing 20.

(2-2) Compression Mechanism

The compression mechanism 30 is one example of the scroll compression mechanism that compresses the refrigerant.

The compression mechanism 30 mainly includes the fixed scroll 31, a movable scroll 32, and the housing 33, as shown in FIG. 1.

The fixed scroll 31 is disposed above the housing 33, as shown in FIG. 1. The fixed scroll 31 is disposed in close contact with the housing 33. The movable scroll 32 is disposed between the fixed scroll 31 and the housing 33, as shown in FIG. 1. The housing 33 supports the movable scroll 32 from below.

In the compression mechanism 30, the fixed scroll 31 and the movable scroll 32 are disposed with a lower surface of an end plate 31a of the fixed scroll 31 and an upper surface of an end plate 32a of the movable scroll 32 facing each other. The compression mechanism 30 combines a spiral (involute) fixed-side wrap 31b protruding downward from the lower surface of the end plate 31a of the fixed scroll 31, and a spiral (involute) movable-side wrap 32b protruding upward from the upper surface of the end plate 32a of the movable scroll 32 to form the compression chamber Sc between the adjacent fixed-side wrap 31b and movable-side wrap 32b.

The movable scroll 32 is provided with a boss part 32c below the end plate 32a. The movable scroll 32 is coupled with the crank shaft 80 by inserting an eccentric part 81 of the crank shaft 80, which will be described later, into the boss part 32c. The crank shaft 80 is coupled with a rotor 60 of the motor 40, as will be described later. When the motor 40 is driven and the crank shaft 80 coupled with the rotor 60 rotates, the movable scroll 32 revolves with respect to the fixed scroll 31 without rotating by the work of an Oldham ring 34 disposed between the movable scroll 32 and the housing 33. The movable scroll 32 turns around, thereby compressing the refrigerant in the compression chamber Sc. The refrigerant compressed in the compression chamber Sc is discharged upward from a discharge port 31c formed in the end plate 31a of the fixed scroll 31. The refrigerant discharged from the discharge port 31c passes through a refrigerant passage 31d formed in the fixed scroll 31 and a refrigerant passage 33b formed in the housing 33, flowing into the first space S1 below the housing 33.

The housing 33 is fixed to the body 21 of the casing 20. Although the fixing method is not limited, the housing 33 is press-fitted into the body 21 of the casing 20, and the entire circumference of the outer peripheral surface of the housing 33 is airtightly fixed to an inner peripheral surface 21a of the body 21. The fixed scroll 31 is closely fixed to the upper surface of the housing 33.

A concave portion 33a recessed downward is formed in the center of the upper portion of the housing 33. The boss part 32c of the movable scroll 32 with which the eccentric part 81 of the crank shaft 80 is coupled is disposed in the concave portion 33a. An upper bearing 35 that pivotally supports the crank shaft 80 is provided below the housing 33. The upper bearing 35 rotatably supports a main shaft 82 of the crank shaft 80, which will be described later.

(2-3) Motor

Figure 2:
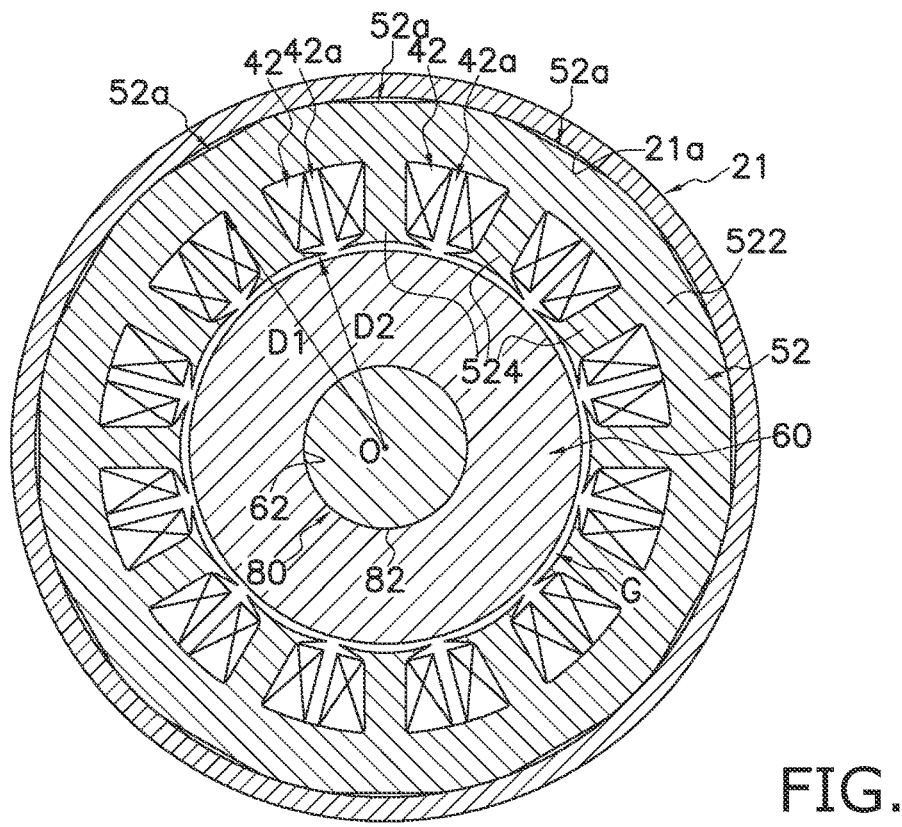
FIG. 2 is a schematic cross-sectional view taken along the line II-II of the scroll compressor of FIG. 1.
Figure 3:
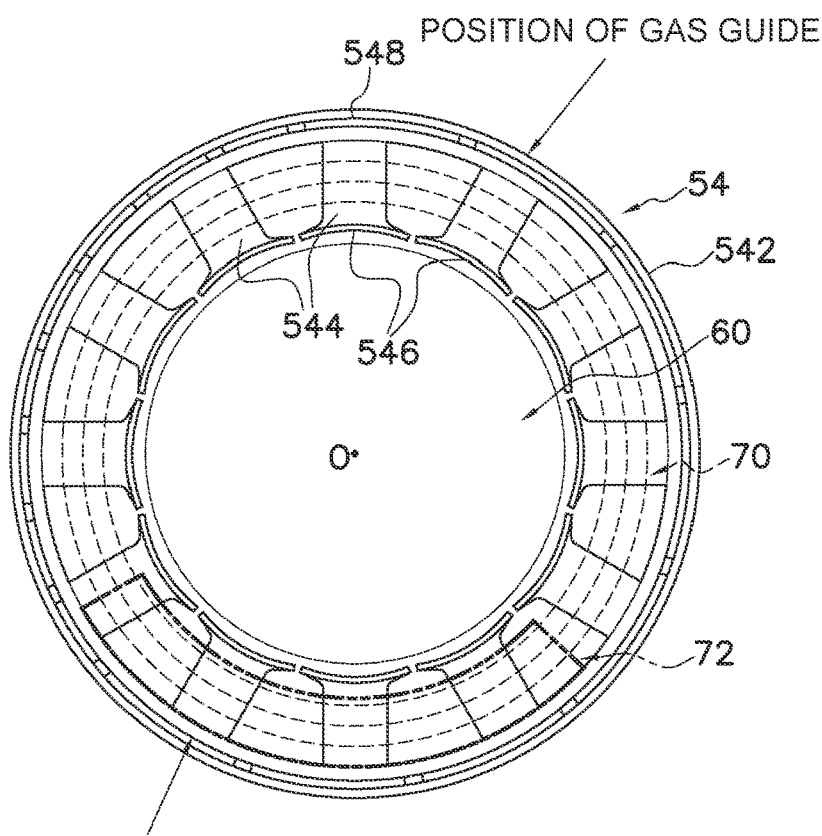
FIG. 3 is a schematic plan view of a motor of the scroll compressor of FIG. 1.
Figure 4:
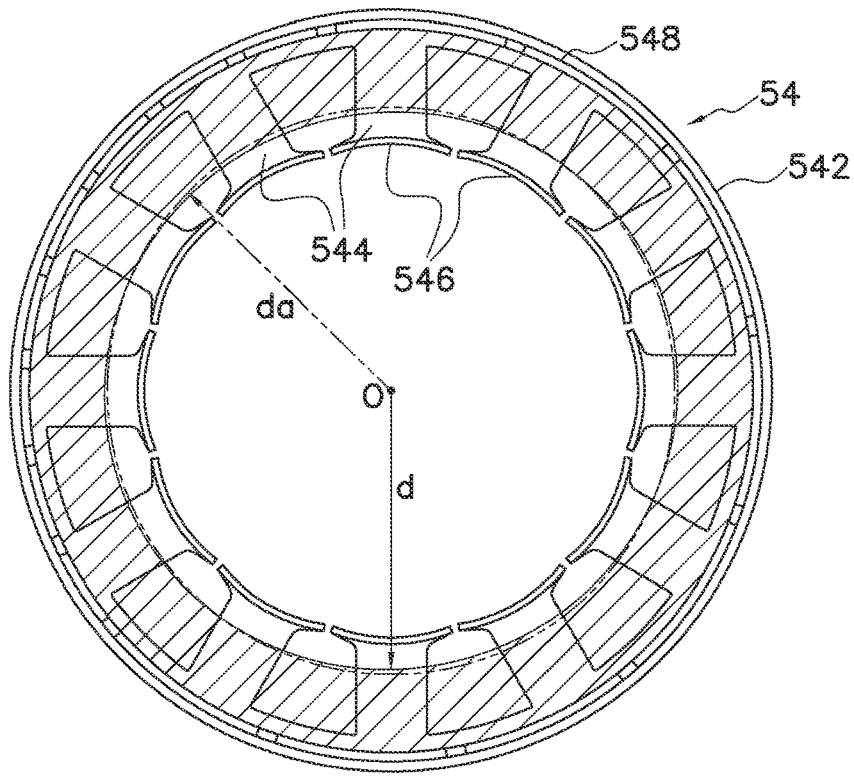
FIG. 4 is a schematic plan view schematically showing a disposition state of outgoing lines disposed above an insulator of the motor of the scroll compressor of FIG. 1, in which the region where the outgoing lines are disposed is shown by hatching.
Figure 5:
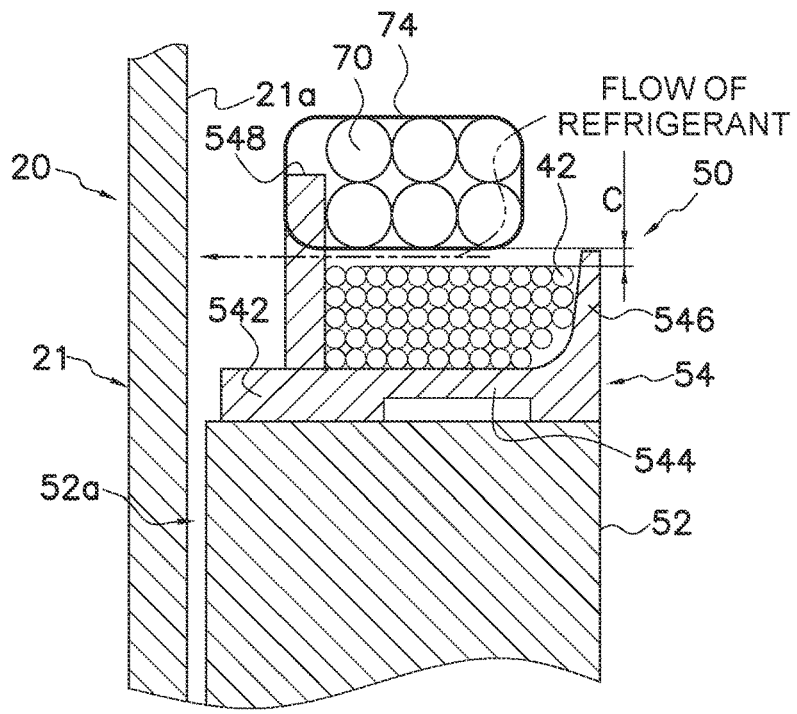
FIG. 5 is a schematic longitudinal cross-sectional view schematically showing an attachment state of the outgoing lines to a stator in the scroll compressor of FIG. 1.
Figure 6:
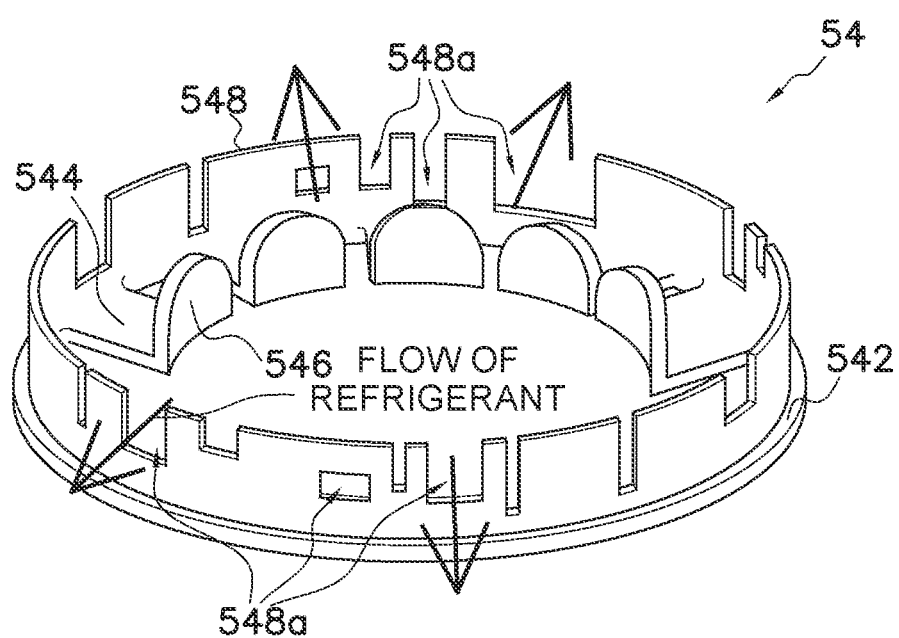
FIG. 6 is a schematic perspective view schematically showing the insulator of the scroll compressor of FIG. 1.

The motor 40 will be described with further reference to FIGS. 2 to 6. FIG. 2 is a schematic cross-sectional view taken along the line II-II of the scroll compressor 10 of FIG. 1. In FIG. 2, parts that are not specifically relevant to the description of the motor 40 is depicted in a simplified manner. FIG. 2 schematically illustrates coils 42 wound around teeth 524 of a stator core 52, which will be described later. FIG. 3 is a schematic plan view of the motor 40 when the motor 40 is viewed from above. FIG. 4 is a schematic plan view schematically showing a disposition state of outgoing lines 70 disposed above an insulator 54. FIG. 5 is a schematic longitudinal cross-sectional view schematically showing the attachment state of the outgoing lines 70 to the stator 50. FIG. 6 is a schematic perspective view schematically showing the insulator 54. To avoid complicated drawing, FIG. 6 depicts the insulator 54 with illustration of some components omitted.

The motor 40 is a drive unit that drives the compression mechanism 30.

The motor 40 is disposed below the compression mechanism 30. Specifically, as shown in FIG. 1, the motor 40 is disposed between the upper bearing 35 provided in the housing 33 of the compression mechanism 30 and the lower bearing 90. The first space S1, where the end of the discharge pipe 24 is disposed, is formed between the motor 40 and the housing 33.

The motor 40 mainly includes the stator 50, the coils 42, the rotor 60, and the outgoing lines 70, as shown in FIG. 1. The stator 50 is formed in a cylindrical shape. The rotor 60 is disposed via a small gap (air gap G) in the interior (hollow portion) of the stator 50, as shown in FIG. 1.

(2-3-1) Stator

The stator 50 mainly includes the stator core 52 and the insulator 54, as shown in FIG. 5. As shown in FIG. 1, the insulator 54 is disposed at both ends of the stator core 52 in the axial direction of the crank shaft 80 (hereinafter, simply referred to as axial direction).

The stator core 52 is formed by, for example, laminating a plurality of magnetic steel sheets. The stator core 52 is formed in a substantially cylindrical shape. The stator core 52 is fixed to the inner peripheral surface 21a of the body 21 of the casing 20. Although the fixing method is not limited, the stator core 52 is press-fitted into the body 21 of the casing 20.

The stator core 52 includes an annular yoke 522 and the plurality of teeth 524, as shown in FIG. 2. Each of the teeth 524 protrudes radially inward from the inner peripheral surface of the yoke 522. The plurality of teeth 524 is arranged on the yoke 522 at equal intervals in the circumferential direction. In the present embodiment, the stator core 52 includes 12 teeth 524 as shown in FIG. 2. However, the number of teeth of the scroll compressor of the present disclosure is not limited to 12.

A core cut 52a cut out so as to be recessed toward the center in the radial direction is formed on part of the outer peripheral surface of the circular shape of the yoke 522. This forms a gap between the core cut 52a and the body 21.

The coils 42 are wound around the plurality of teeth 524 via the insulator 54. Each of the coils 42 is wound around the single tooth 524, not across the plurality of teeth 524. In short, the motor 40 is a motor of concentrated winding. There is a gap 42a between the coil 42 wound around each tooth 524 and the coil 42 wound around the tooth 524 adjacent to the above-described tooth 524, as shown in FIG. 2.

The insulator 54 is attached to the upper and lower ends of the stator core 52 as shown in FIG. 1. The insulator 54 is provided in order to insulate the stator core 52 from the coil 42.

The insulator 54 mainly includes an annular part 542, a plurality of tooth parts 544, a first wall 546, and a second wall 548, as shown in FIG. 6. The annular part 542 is provided at a position corresponding to the yoke 522 of the stator core 52. In other words, the annular part 542 is provided adjacent to the yoke 522 of the stator core 52 in the axial direction. Each tooth part 544 protrudes radially inward from the inner peripheral surface of the annular part 542. The plurality of tooth parts 544 is arranged on the annular part 542 at equal intervals in the circumferential direction. The plurality of tooth parts 544 is provided at positions corresponding to the teeth 524 of the stator core 52. In other words, the number of tooth parts 544 and the number of teeth 524 are the same. In the axial direction, each of the plurality of tooth parts 544 is provided adjacent to corresponding one of the teeth 524 of the stator core 52. The first wall 546 is provided at the inner end of each tooth part 544 and extends on the opposite side of the stator core 52 in the axial direction. The second wall 548 extends on the opposite side of the stator core 52 from the end face of the annular part 542 in the axial direction. The second wall 548 is formed in a substantially cylindrical shape in plan view.

The second wall 548 of the insulator 54 disposed above the stator core 52 is provided with a plurality of openings 548a. The openings 548a here include both through holes and cutouts provided on the second wall 548.

Part of the openings 548a is used for position adjustment of the outgoing lines 70. For example, in part of the openings 548a (particularly cutout here), the outgoing lines 70 are sandwiched and held by the second wall 548 adjacent to the opening 548a. For example, when attaching the outgoing lines 70 to the insulator 54, part of the openings 548a (particularly through hole here) is used as a mounting part for a fixture 74 of the outgoing lines 70.

At least part of the openings 548a is used to guide the refrigerant gas rising from the space below the motor 40 through the gap 42a between the coils 42 to the inner peripheral surface 21a of the body 21 of the casing 20, as will be described later.

(2-3-2) Rotor

The rotor 60 is rotatably housed in the hollow portion of the stator 50. A central hole 62 for inserting the main shaft 82 of the crank shaft 80 is formed in the central part of the rotor 60 (see FIG. 1). The main shaft 82 is inserted into the central hole 62 of the rotor 60 and the rotor 60 is fixed to the main shaft 82, whereby the rotor 60 is coupled with the movable scroll 32 via the crank shaft 80.

A plurality of permanent magnets (not shown) is embedded in the rotor 60. Supply of a current to the coil 42 of the stator 50 generates a rotating magnetic field. The rotor 60 rotates around a rotation axis O because the permanent magnet provided in the rotor 60 is affected by the rotating magnetic field, and causes the movable scroll 32, which is coupled via the crank shaft 80, to rotate. The rotation axis O of the rotor 60 and the rotation axis of the crank shaft 80 align.

(2-3-3) Outgoing Line

The motor 40 includes the plurality of outgoing lines 70. Each outgoing line 70 is provided at an end of each coil 42 wound around each tooth 524 of the stator core 52. The outgoing line 70 is a lead wire that connects the coil 42 to a terminal (not shown) for supplying electric power to the coil 42. Electric power is supplied to the coils 42 via the outgoing lines 70. The outgoing lines 70 are disposed above the motor 40 and above the coils 42 wound around the teeth 524 of the stator core 52 via the insulator 54 (see FIGS. 1 and 3).

A film 72 made of an insulating material may be wound around the outgoing lines 70 so as to hold the plurality of outgoing lines 70 together. The film 72 is made of, for example, resin. The film 72 may be wound around part of the outgoing lines 70, or may be wound around the entire outgoing lines 70.

In the present embodiment, the film 72 wound around the outgoing lines 70 is disposed in a predetermined region of the circumferential direction in plan view. The position where the film 72 is preferably disposed will be described later. Note that the film 72 may not be used in the motor 40.

A disposition example in which the outgoing lines 70 and the film 72 wound around the outgoing lines 70 when the motor 40 is viewed along the rotation axis O of the rotor 60 will be described.

To begin with, some words and symbols used in the description will be defined.

In the following description, when the motor 40 is viewed along the rotation axis O of the rotor 60, an outer radius of the teeth 524 of the stator core 52 centered on the position of the rotation axis O of the rotor 60 is represented as symbol D1, and an inner radius of the teeth 524 centered on the position of the rotation axis O is represented as symbol D2.

Note that when the motor 40 is viewed along the rotation axis O, since the insulator 54 and the outgoing lines 70 are actually present above the stator core 52, the stator core 52 cannot be viewed directly. Therefore, when the expression "when the motor 40 is viewed along the rotation axis O" is used here, it is assumed that members that hinder visual observation of an object are removed.

The outer radius D1 of the teeth 524 when the motor 40 is viewed along the rotation axis O specifically means the distance between the rotation axis O and a connection portion between the yoke 522 and the teeth 524 in plan view (see FIG. 2). The inner radius D2 of the teeth 524 when the motor 40 is viewed along the rotation axis O specifically means the distance between the rotation axis O and an inner peripheral end of the teeth 524 (minimum distance) in plan view (see FIG. 2).

In the following description, the distance from the position of the rotation axis O of the rotor 60 to the outgoing lines 70 or the film 72 when the motor 40 is viewed along the rotation axis O of the rotor 60 is represented as symbol d (see FIG. 4). In short, here, the distance from the rotation axis O to the outgoing lines 70 and the film 72 wound around the outgoing lines 70 is represented as symbol d in plan view. Note that in the motor 40, the distance (shortest distance) between the rotation axis O and the outgoing lines 70 or the film 72 in plan view does not have to be constant. Note that the distance between the rotation axis O and the outgoing lines 70 or the film 72 being not constant in plan view means that the distance d between the rotation axis O and the outgoing lines 70 or the film 72 (shortest distance from the position of the rotation axis O to the outgoing lines 70 or the film 72) differs depending on the position in the circumferential direction.

In the following description, the average distance from the position of the rotation axis O of the rotor 60 to the outgoing lines 70 and the film 72 wound around the outgoing lines 70 when the motor 40 is viewed along the rotation axis O of the rotor 60 is represented as symbol da (see the two-dot chain line in FIG. 4). In other words, here, the average distance from the rotation axis O to the outgoing lines 70 and the film 72 wound around the outgoing lines 70 in plan view is represented as symbol da.

In the above-described definition of symbols, in the scroll compressor 10 of the present disclosure, the outgoing lines 70 and the film 72 wound around the outgoing lines 70 are disposed so as to satisfy the relationship of $$0.65 < (D1-da)/(D1-D2) < 0.95 \qquad \text{(Formula 1)}.$$

As a result, in the scroll compressor 10 of the present disclosure, when the motor 40 is viewed along the rotation axis O of the rotor 60, on average, the area surrounded by a circle having the radius da ($0.05D1+0.95D2 < da < 0.35D1+0.65D2$) centered on the rotation axis O and a circle having the outer radius D1 centered on the rotation axis O is generally covered with the outgoing lines 70 or the film 72. Note that in order to avoid complicated description, the value of $(D1-da)/(D1-D2)$ may be referred to as an average stator end face coverage rate in the following description.

Preferably, in the scroll compressor 10, in a region of at least 95% or more of the circumferential direction centered on the position of the rotation axis O, the outgoing lines 70 and the film 72 wound around the outgoing lines 70 are disposed to satisfy the relationship of $$0.65 < (D1-d)/(D1-D2) < 0.95 \qquad \text{(Formula 2)}.$$

As a result, in the scroll compressor 10 of the present disclosure, when the motor 40 is viewed along the rotation axis O of the rotor 60, in the region of 95% or more of the circumferential direction, the area surrounded by the circle having the radius d ($0.05D1+0.95D2 < d < 0.35D1+0.65D2$) centered on the rotation axis O and the circle having the outer radius D1 centered on the rotation axis O is largely covered with the outgoing lines 70 or the film 72. Note that in order to avoid complicated description, the value of $(D1-d)/(D1-D2)$ may be referred to as a stator end face coverage rate in the following description.

More preferably, in the scroll compressor 10, the outgoing lines 70 and the film 72 are disposed so as to satisfy the relationship of Formula 2 in the entire region of the circumferential direction centered on the position of the rotation axis O.

In short, in the scroll compressor 10 of the present disclosure, when the motor 40 is viewed along the rotation axis O of the rotor 60, most of the region between the outer radius D1 of the teeth 524 of the stator core 52 and the inner radius D2 of the teeth 524 is covered with the outgoing lines 70 or the film 72.

Figure 7:
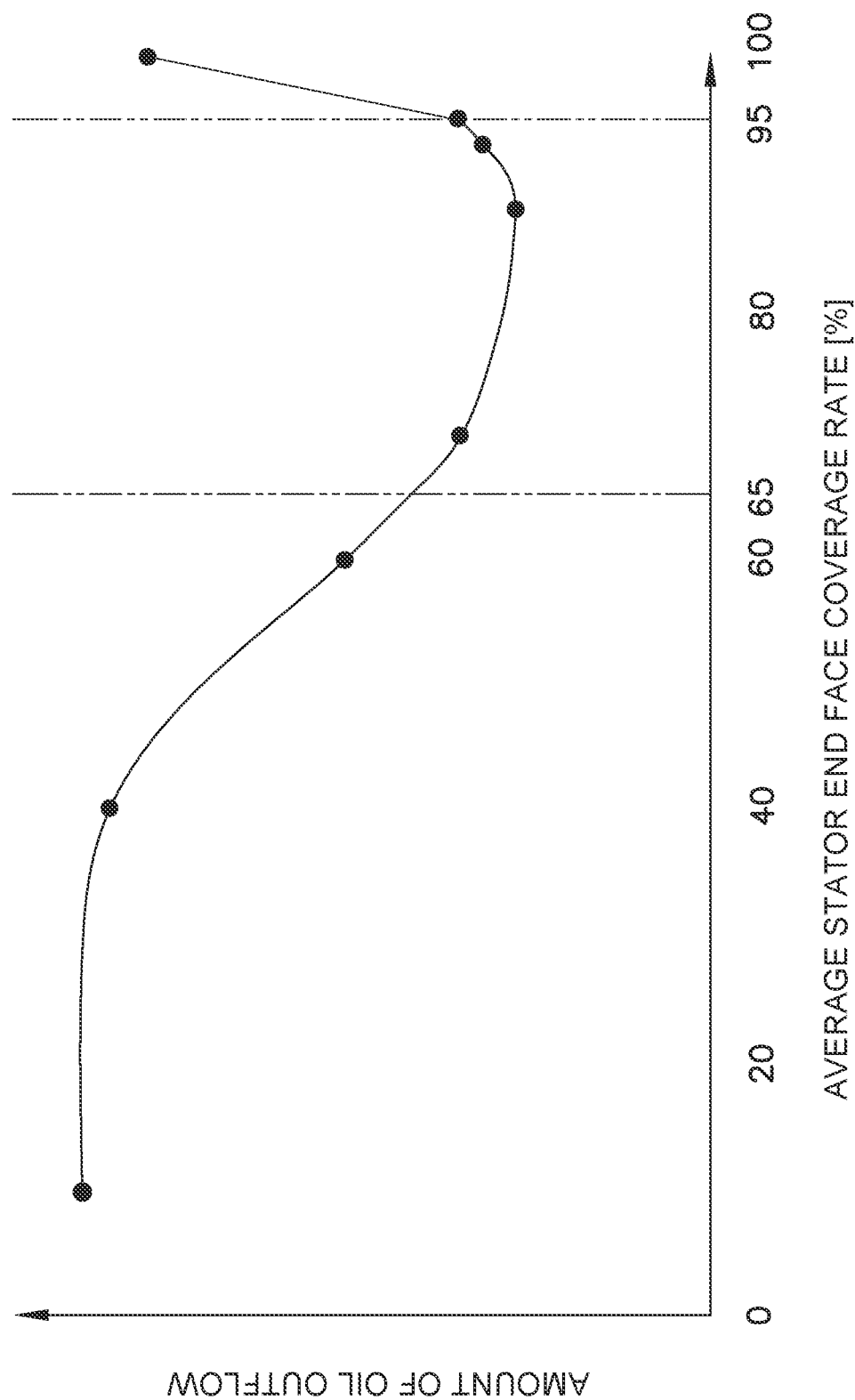
FIG. 7 is experimental data, in the scroll compressor, showing a change in the amount of oil outflow to the outside of the scroll compressor when an average stator end face coverage rate by the outgoing lines is changed.

The effect obtained by disposition of the outgoing lines 70 and the film 72 satisfying Formula 1 will be described with reference to FIG. 7. FIG. 7 is experimental data, in the scroll compressor 10, showing a change in the amount of oil outflow to the outside of the scroll compressor 10 when the average stator end face coverage rate [%] by the outgoing lines 70 is changed. Structure of the scroll compressor 10 used in the experiment and an operating condition of the scroll compressor 10 are the same except for the average stator end face coverage rate.

Before describing the effect, the flow of refrigerant around the motor 40 during the operation of the scroll compressor 10 will be described.

As described above, the refrigerant compressed by the compression mechanism 30 passes through the refrigerant passage 31*d* formed in the fixed scroll 31 and the refrigerant passage 33*b* formed in the housing 33, and then flows into the first space S1.

As shown in FIG. 1, a guide 26 is provided in the first space S1 to guide part of the refrigerant that has passed through the refrigerant passage 31*d* and the refrigerant passage 33*b* and has flowed into the first space S1 to the gap between the core cut 52*a* of the stator core 52 and the inner peripheral surface 21*a* of the body 21 of the casing 20. Specifically, part of the refrigerant discharged by the compression mechanism 30 into the first space S1 is guided by the guide 26 to flow downward, and flows downward through a gap between part of the core cut 52*a* of the stator core 52 and the inner peripheral surface 21*a* of the body 21 (referred to as first gap) to the space below the motor 40. Note that the guide 26 also has a function of dividing part of the refrigerant flowing downward through the guide 26 to generate the flow of refrigerant in the circumferential direction in the first space S1.

The refrigerant guided by the guide 26 and flowing into the space below the motor 40 changes the flow direction upward. Part of the refrigerant that has flowed into the space below the motor 40 flows upward through the air gap G between the stator 50 and the rotor 60 and a gap between the core cut 52*a* and the inner peripheral surface 21*a* of the body 21 (gap other than the first gap through which the refrigerant flows downward) (see FIG. 1). Part of the refrigerant that has flowed into the space below the motor 40 flows upward through the gap 42*a* formed between the coils 42.

The refrigerant guided by the guide 26 in the circumferential direction in the first space S1, and the refrigerant that has flowed into the first space S1 from the space below the motor 40 through the air gap G, the gap between the core cut 52*a* and the inner peripheral surface 21*a* of the body 21, the gap 42*a* between the coils 42, and the like are discharged from the discharge pipe 24 to the outside of the casing 20.

The inventor of the present application has found that, since such a flow of refrigerant occurs around the motor 40, when an upper portion of the coils 42 of the motor 40 is not well covered with the outgoing lines 70 (in other words, when the average stator end face coverage rate is low), the oil L existing below the motor 40 easily moves to the first space S1 together with the refrigerant flowing upward through the gap 42*a* formed between the coils 42, and the amount of oil L that flows out of the scroll compressor 10 together with the refrigerant tends to increase (see FIG. 7). The inventor of the present application has found that the amount of oil L flowing out of the scroll compressor 10 is reduced by making the average stator end face coverage rate larger than 0.65 in the motor 40 (see FIG. 7). Furthermore, the inventor of the present application has found that if the average stator end face coverage rate is too large (larger than 0.95) in the motor 40, the amount of oil L flowing out of the scroll compressor 10 tends to increase (see FIG. 7).

Considering these results, in the scroll compressor 10 of the present embodiment, the outgoing lines 70 and/or the film 72 wound around the outgoing lines 70 are disposed so as to satisfy Formula 1. Such a configuration allows the scroll compressor 10 of the present embodiment to reduce the amount of oil L flowing out of the scroll compressor 10.

Note that even when the average stator end face coverage rate satisfies Formula 1, if the area where the stator end face coverage rate is not in the range from 0.65 to 0.95 increases, the effect of inhibiting the amount of oil outflow to the outside of the scroll compressor 10 by the outgoing lines 70 or the film 72 tends to decrease at these areas. Therefore, the stator end face coverage rate preferably satisfies the relationship of Formula 2 in most regions.

In particular, as described above, the scroll compressor 10 preferably satisfies the relationship of Formula 2 in the region of 95% or more of the circumferential direction when the motor 40 is viewed along the rotation axis O of the rotor 60. More preferably, the scroll compressor 10 preferably satisfies the relationship of Formula 2 in the entire region when the motor 40 is viewed along the rotation axis O of the rotor 60, as described above.

Such a configuration allows the scroll compressor 10 of the present embodiment to reduce the amount of oil L flowing out of the scroll compressor 10 particularly easily.

As described above, the refrigerant guided by the guide 26 and flowing into the space below the motor 40 changes the flow direction of the refrigerant upward in the space below the motor 40. The upward flow velocity of the refrigerant is likely to be particularly large on the opposite side of the guide 26 across the rotation axis O when the motor 40 is viewed along the rotation axis O of the rotor 60 (rotation axis of crank shaft 80). Therefore, the film 72 wound around the outgoing lines 70 is preferably disposed at a position where the upward flow velocity of the refrigerant is likely to increase, as shown in FIG. 3, in order to inhibit the refrigerant that has passed through the gap 42a from flowing directly into the first space S1 (without hitting other members). The reason why it is preferable to dispose the film 72 is that, if the outgoing lines 70 around which no film 72 is wound are disposed, the refrigerant may pass through a small gap formed between the outgoing line 70 and the outgoing line 70.

Preferably, in the scroll compressor 10, the outgoing lines 70 and the film 72 wound around the outgoing lines 70 are disposed such that the gap C in the direction of the rotation axis O between the outgoing lines 70 and the film 72, and the coils 42 (see FIG. 5) is 2 mm or more. Specifically, when the outgoing lines 70 are attached to the second wall 548 of the insulator 54 or the like, the outgoing lines 70 are preferably fixed to the insulator 54 with the fixture 74 such that the gap C of 2 mm or more is formed between the outgoing lines 70 and the film 72, and the coils 42. The fixture 74 is, for example, a tie strap.

Since the gap C of 2 mm or more is provided from the outgoing lines 70 and the film 72 to the coils 42, the refrigerant that has risen through the gap 42a between the coils 42 to the upper end position of the coils 42 can be guided radially outward through the gap C. The refrigerant guided radially outward between the coils 42, and the outgoing lines 70 or the film 72 wound around the outgoing lines 70 passes through the opening 548a formed in the second wall 548 of the insulator 54 and collides with the inner peripheral surface 21a of the body 21 of the casing 20. By causing the refrigerant to collide with the inner peripheral surface 21a of the body 21 in this way, the oil L carried with the refrigerant can be stuck as oil droplets to the inner peripheral surface 21a of the body 21 and the amount of oil outflow to the outside of the scroll compressor 10 can be reduced.

Figure 8:
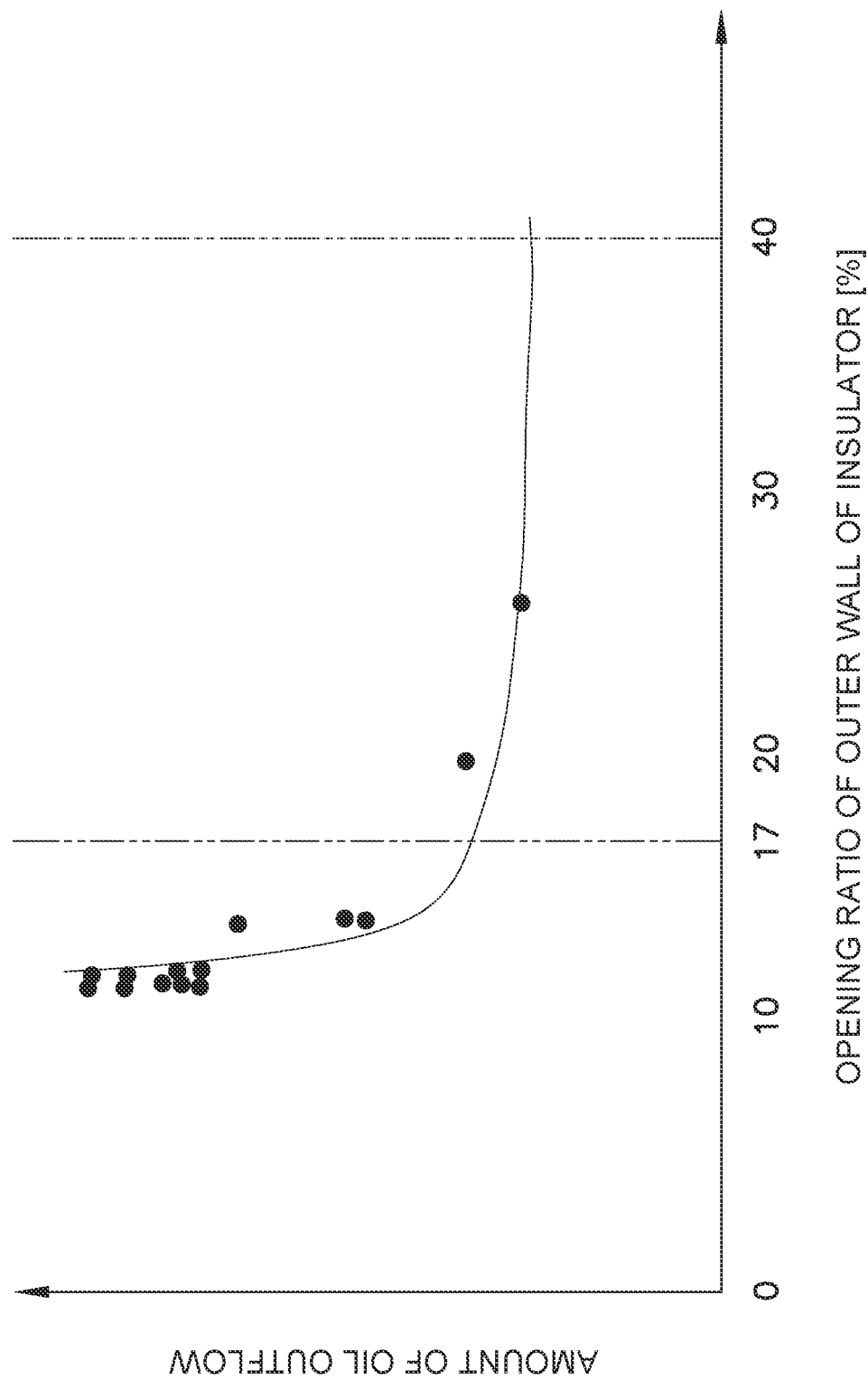
FIG. 8 is experimental data, in the scroll compressor, showing the change in the amount of oil outflow to the outside of the scroll compressor when an opening ratio of a second wall of the insulator is changed.

Note that in general, the opening 548a is conventionally formed in the second wall 548 of the insulator 54 for the purpose of fixing the outgoing lines 70, or the like. However, the inventor of the present application has found that, by increasing the area of the opening 548a formed in the second wall 548 of the insulator 54 and increasing the amount of refrigerant that collides with the inner peripheral surface 21a of the body 21 of the casing 20, the amount of oil outflow to the outside of the scroll compressor 10 tends to reduce. This will be described with reference to FIG. 8. FIG. 8 is experimental data, in the scroll compressor 10, showing the change in the amount of oil outflow to the outside of the scroll compressor 10 when the average stator end face coverage rate is fixed at 0.65 and an opening ratio of the second wall 548 of the insulator 54 is changed.

Figure 9:
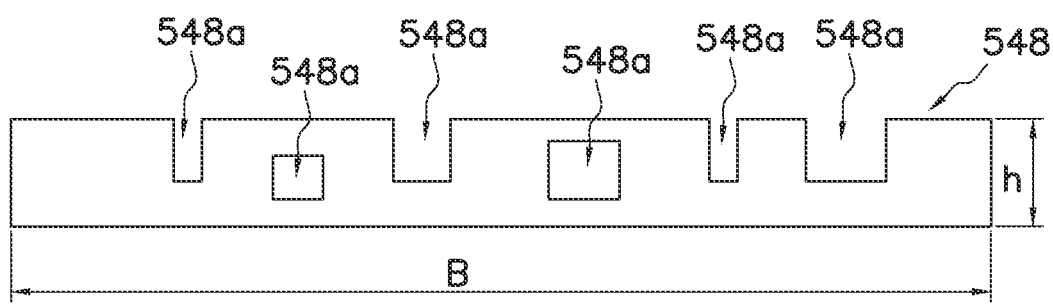
FIG. 9 is a drawing for describing definition of the opening ratio of the second wall of the insulator.

To provide a description here, the opening ratio of the second wall 548 of the insulator 54 is defined. The second wall 548 of the insulator 54 is formed in a cylindrical shape, but it is assumed that this is developed in a plane shape as shown in FIG. 9. At this time, the product of the height h (maximum height) of the second wall 548 and the length B (length of the circumferential direction) of the second wall 548 is referred as total area At. It is assumed that the total area of the openings 548a formed in the second wall 548 is Ao. At this time, the opening ratio of the second wall 548 of the insulator 54 is defined by Ao/At.

As a result of experiment, as shown in FIG. 8, it has been found that, when the opening ratio of the second wall 548 of the insulator 54 is 17% or more, the amount of oil outflow to the outside of the scroll compressor 10 is easily reduced. Meanwhile, from the viewpoint of strength of the second wall 548 of the insulator 54, the opening ratio of the second wall 548 of the insulator 54 is preferably less than 40%.

(2-4) Crank Shaft

The crank shaft 80 is a shaft that transmits driving force of the motor 40 to the movable scroll 32. The crank shaft 80 is disposed to extend in the up-and-down direction along the axis of the body 21 of the casing 20, and couples the rotor 60 of the motor 40 with the movable scroll 32 of the compression mechanism 30 (see FIG. 1).

The crank shaft 80 includes the main shaft 82 and the eccentric part 81 eccentric with respect to the rotation axis of the main shaft 82 (see FIG. 1).

The eccentric part 81 is disposed at the upper end of the main shaft 82 and is coupled with the boss part 32c of the movable scroll 32.

The main shaft 82 is rotatably supported by the upper bearing 35 provided in the housing 33, and the lower bearing 90, which will be described later. The main shaft 82 is coupled with the rotor 60 of the motor 40 between the upper bearing 35 and the lower bearing 90. The main shaft 82 rotates around a center axis extending in the up-and-down direction.

Inside the crank shaft 80, the oil supply path 84 is formed for supplying the oil L to the compression mechanism 30 and the sliding portion between the crank shaft 80, and the upper bearing 35 and the lower bearing 90. The oil in the oil reservoir space 25 passes through the oil supply path 84 and is supplied to the compression mechanism 30 and the like.

(2-5) Lower Bearing

The lower bearing 90 is a bearing pivotally supporting the crank shaft 80 and is disposed below the motor 40 (see FIG. 1). The lower bearing 90 is fixed to the body 21 of the casing 20. The lower bearing 90 rotatably supports the main shaft 82 of the crank shaft 80.

(3) Description of Operation of Scroll Compressor

The operation of the scroll compressor 10 will be described.

When a current is supplied to the coils 42 via the outgoing lines 70 and the motor 40 is driven, the rotor 60 rotates and the crank shaft 80 coupled with the rotor 60 rotates. The rotation of the crank shaft 80 drives the movable scroll 32. The movable scroll 32 revolves with respect to the fixed scroll 31 without rotating.

With the revolution of the movable scroll 32, the volume of the compression chamber Sc of the compression mechanism 30 changes periodically. When the volume of the compression chamber Sc increases, the low-pressure gas refrigerant is supplied to the compression chamber Sc through the intake pipe 23. More specifically, when the volume of the compression chamber Sc on the outermost peripheral side increases, the low-pressure gas refrigerant supplied from the intake pipe 23 is supplied to the compression chamber Sc on the outermost peripheral side. Meanwhile, when the volume of the compression chamber Sc decreases, the gas refrigerant is compressed in the compression chamber Sc and finally becomes a high-pressure gas refrigerant. The high-pressure gas refrigerant is discharged from the discharge port 31c located near the center of the upper surface of the fixed scroll 31. The high-pressure gas refrigerant discharged from the discharge port 31c passes through the refrigerant passage 31d formed in the fixed scroll 31 and the refrigerant passage 33b formed in the housing 33, flowing into the first space S1 below the housing 33. The flow of refrigerant after flowing into the first space S1 is as described above, and thus detailed description thereof will be omitted here. The high-pressure gas refrigerant compressed by the compression mechanism 30 is finally discharged from the discharge pipe 24 to the outside of the scroll compressor 10.

(4) Features (4-1)

The scroll compressor 10 of the present embodiment includes the compression mechanism 30 as one example of the scroll compression mechanism, the motor 40, and the casing 20. The compression mechanism 30 compresses the refrigerant. The motor 40 drives the compression mechanism 30. The casing 20 houses the compression mechanism 30 and the motor 40. The motor 40 includes the stator 50, the rotor 60, the coils 42, and the outgoing lines 70. The stator 50 includes the stator core 52 and the insulator 54. The rotor 60 is disposed inside the stator 50. The coils 42 are wound around the plurality of teeth 524 of the stator core 52 via the insulator 54. The outgoing lines 70 are provided at the end of the coils 42. When the motor 40 is viewed along the rotation axis of the rotor 60, it is assumed that the outer radius of the teeth 524 centered on the position of the rotation axis O of the rotor 60 is D1 and the inner radius of the teeth 524 centered on the position of the rotation axis O of the rotor 60 is D2, and that the average distance from the position of the rotation axis O of the rotor 60 to the outgoing lines 70 and/or the film 72 wound around the outgoing lines 70 is da. The outgoing lines 70 and/or the film 72 wound around the outgoing lines 70 is disposed to satisfy the relationship of $$0.65 < (D1-da)/(D1-D2) < 0.95.$$

In this scroll compressor 10, the outgoing lines 70 and/or the film 72 wound around the outgoing lines 70 is disposed to satisfy the above-described formula, and the end face of the stator 50 is covered to some extent. As a result, it is possible to inhibit the oil L from moving together with the refrigerant passing through the gap 42a between the coils 42 and being carried out in large quantities to the outside of the scroll compressor 10.

Here, since the outgoing lines 70 and the film 72 wound around the outgoing lines 70 are used to cover the end face of the stator 50, the cost can be inhibited more than in the case where the end face of the stator 50 is covered with another member.

(4-2)

In the scroll compressor 10 of the present embodiment, in the region of at least 95% or more of the circumferential direction centered on the position of the rotation axis O, the outgoing lines 70 and/or the film 72 wound around the outgoing lines 70 is disposed to satisfy the relationship of $$0.65 < (D1-d)/(D1-D2) < 0.95.$$

Here, d is the distance from the position of the rotation axis O of the rotor 60 to the outgoing lines 70 and/or the film 72 wound around the outgoing lines 70.

In this scroll compressor 10, the outgoing lines 70 and/or the film 72 wound around the outgoing lines 70 is disposed to satisfy the above-described formula in the region of 95% or more of the circumferential direction. This makes it particularly easy to inhibit the oil L from moving together with the refrigerant passing through the gap 42a between the coils 42 and being carried out in large quantities to the outside of the scroll compressor 10.

(4-3)

In the scroll compressor 10 of the present embodiment, the gap C between the outgoing lines 70 and the coils 42 in the direction of the rotation axis O of the rotor 60 is 2 mm or more.

In this scroll compressor 10, at least part of the refrigerant that has passed through the gap 42a between the coils 42 can be guided radially outward through the gap C between the outgoing lines 70 and the coils 42. Therefore, this scroll compressor 10 can reduce the total amount of oil L that has moved together with the refrigerant in the gap 42a between the coils 42 from flowing directly into the first space S1 between the motor 40 and the compression mechanism 30 and flowing out of the scroll compressor 10.

(4-4)

In the scroll compressor 10 of the present embodiment, the opening 548a of 17% or more and less than 40% is formed in the second wall 548 of the insulator 54 disposed to surround the outgoing lines 70. The second wall 548 is one example of an outer wall of the insulator 54.

In this scroll compressor 10, at least part of the refrigerant that has passed through the gap 42a between the coils 42 passes through the opening 548a of the second wall 548 of the insulator 54 and heads for the inner peripheral surface 21a of the body 21 of the casing 20, colliding with the inner peripheral surface 21a. Therefore, the outflow of oil L to the outside of the scroll compressor 10 is more easily reduced than when the refrigerant that has passed through the gap 42a between the coils 42 heads directly for the outside of the scroll compressor 10. Since the proportion of the opening 548a to the second wall 548 of the insulator 54 is less than 40%, the required strength of the second wall 548 of the insulator 54 can also be maintained.

(4-5)

The scroll compressor 10 of the present embodiment includes the guide 26. The guide 26 guides the refrigerant discharged by the compression mechanism 30 to the first space S1 above the motor 40 to the space below the motor 40. When the motor 40 is viewed along the rotation axis O, the film 72 wound around the outgoing lines 70 is disposed at least on the opposite side of the guide 26 across the rotation axis O.

In this scroll compressor 10, at least the film 72 is disposed in the region on the opposite side of the guide 26 where the flow velocity of the refrigerant is likely to be particularly large. Therefore, it is possible to inhibit the oil L from moving together with the refrigerant passing through the gap 42a between the coils 42 and being carried out in large quantities to the outside of the scroll compressor 10.

(5) Modifications

Modifications of the above-described embodiment will be described below. Note that a plurality of modifications described below may be appropriately combined as long as no contradiction with each other arises.

(5-1) Modification A

The above-described embodiment has described the case where the film 72 is wound around part of the outgoing lines 70, but the film 72 may not be wound around the outgoing lines 70, or the film 72 may be wound around the entire outgoing lines 70.

(5-2) Modification B

In the above-described embodiment, the opening 548a formed in the second wall 548 of the insulator 54 is illustrated in a rectangular shape, but the shape of the opening 548a is not limited to the rectangular shape, and may be appropriately determined.

Supplementary Note

The embodiment of the present disclosure has been described above. It will be understood that various changes to modes and details can be made without departing from the spirit and scope of the present disclosure recited in the claims.

The present disclosure is widely applicable to the scroll compressor and is useful.

The invention claimed is:

1. A scroll compressor comprising:
a scroll compression mechanism configured to compress a refrigerant;
a motor configured to drive the scroll compression mechanism; and
a casing housing the scroll compression mechanism and the motor,
the motor including
a stator including a stator core and an insulator,
a rotor disposed inside the stator,
a coil wound around a plurality of teeth of the stator core via the insulator, and
an outgoing line provided at an end of the coil,
when the motor is viewed along a rotation axis of the rotor, at least one of the outgoing line and a film wound around the outgoing line is disposed to satisfy the following equation:

$$0.65 < (D1-da)/(D1-D2) < 0.95,$$

where D1 is a radius of a circle along which outer radial ends of the teeth are arranged and that is centered on a position of the rotation axis of the rotor, D2 is a radius of a circle along which inner radial ends of the teeth are arranged and that is centered on the position of the rotation axis of the rotor, and da is an average distance from the position of the rotation axis of the rotor to the at least one of the outgoing line and the film wound around the outgoing line.

2. The scroll compressor according to claim 1, wherein in a region of at least 95% or more of a circumferential direction centered on the position of the rotation axis, the at least one of the outgoing line and the film wound around the outgoing line is disposed to satisfy the following equation:

$$0.65 < (D1-d)/(D1-D2) < 0.95,$$

where d is a distance from the position of the rotation axis of the rotor to the at least one of the outgoing line and the film wound around the outgoing line.

3. The scroll compressor according to claim 2, wherein a gap is formed between the at least one of the outgoing line and the film wound around the outgoing line and the coil in a rotation axis direction of the rotor.

4. The scroll compressor according to claim 2, wherein an opening of at least 17% and less than 40% is formed in an outer wall of the insulator disposed to surround the outgoing line.

5. The scroll compressor according to claim 2, further comprising:
a guide configured to guide the refrigerant discharged by the scroll compression mechanism into a space above the motor to a space below the motor,
when the motor is viewed along the rotation axis, the film wound around the outgoing line being disposed at least on an opposite side of the guide across the rotation axis.

6. The scroll compressor according to claim 2, wherein the motor is a motor of concentrated winding.

7. The scroll compressor according to claim 1, wherein a gap is formed between the at least one of the outgoing line and the film wound around the outgoing line and the coil in a rotation axis direction of the rotor.

8. The scroll compressor according to claim 7, wherein an opening of at least 17% and less than 40% is formed in an outer wall of the insulator disposed to surround the outgoing line.

9. The scroll compressor according to claim 7, further comprising:
a guide configured to guide the refrigerant discharged by the scroll compression mechanism into a space above the motor to a space below the motor,
when the motor is viewed along the rotation axis, the film wound around the outgoing line being disposed at least on an opposite side of the guide across the rotation axis.

10. The scroll compressor according to claim 7, wherein the motor is a motor of concentrated winding.

11. The scroll compressor according to claim 1, wherein an opening of at least 17% and less than 40% is formed in an outer wall of the insulator disposed to surround the outgoing line.

12. The scroll compressor according to claim 11, further comprising:
a guide configured to guide the refrigerant discharged by the scroll compression mechanism into a space above the motor to a space below the motor,
when the motor is viewed along the rotation axis, the film wound around the outgoing line being disposed at least on an opposite side of the guide across the rotation axis.

13. The scroll compressor according to claim 11, wherein the motor is a motor of concentrated winding.

14. The scroll compressor according to claim 1, further comprising:
   a guide configured to guide the refrigerant discharged by the scroll compression mechanism into a space above the motor to a space below the motor,
   when the motor is viewed along the rotation axis, the film wound around the outgoing line being disposed at least on an opposite side of the guide across the rotation axis.

15. The scroll compressor according to claim 14, wherein the motor is a motor of concentrated winding.

16. The scroll compressor according to claim 1, wherein the motor is a motor of concentrated winding.

* * * * *